United States Patent
Tanaka et al.

(10) Patent No.: US 9,845,848 B2
(45) Date of Patent: Dec. 19, 2017

(54) FRICTION ROLLER TYPE REDUCTION GEAR

(71) Applicant: NSK LTD., Tokyo (JP)

(72) Inventors: Kazutaka Tanaka, Fujisawa (JP); Yasuyuki Matsuda, Fujisawa (JP)

(73) Assignee: NSK LTD., Tokyo (JP)

(*) Notice: Subject to any disclaimer, the term of this patent is extended or adjusted under 35 U.S.C. 154(b) by 83 days.

(21) Appl. No.: 15/032,493

(22) PCT Filed: Sep. 26, 2014

(86) PCT No.: PCT/JP2014/075636
§ 371 (c)(1),
(2) Date: Apr. 27, 2016

(87) PCT Pub. No.: WO2015/064258
PCT Pub. Date: May 7, 2015

(65) Prior Publication Data
US 2016/0252168 A1    Sep. 1, 2016

(30) Foreign Application Priority Data

Oct. 28, 2013  (JP) ................. 2013-223622
Apr. 8, 2014   (JP) ................. 2014-079681

(51) Int. Cl.
F16H 13/08    (2006.01)
F16H 13/14    (2006.01)
F16H 25/18    (2006.01)

(52) U.S. Cl.
CPC ............. F16H 13/08 (2013.01); F16H 13/14 (2013.01); F16H 25/186 (2013.01)

(58) Field of Classification Search
CPC .......... F16H 13/08; F16H 13/06; F16H 13/14; F16H 25/186

(Continued)

(56) References Cited

U.S. PATENT DOCUMENTS 3,252,355 A * 5/1966 Hewko ............. F16H 13/06
                                                 416/129
3,283,614 A * 11/1966 Hewko ............. F16H 13/06
                                                 475/183

(Continued)

FOREIGN PATENT DOCUMENTS

JP    59-187154 A    10/1984
JP    9-280342 A     10/1997

(Continued)

OTHER PUBLICATIONS

International Search Report dated Dec. 22, 2014 issued by International Searching Authority in counterpart International Patent Application No. PCT/JP2014/075636 (PCT/ISA/210).

(Continued)

Primary Examiner — Roger L Pang
(74) Attorney, Agent, or Firm — Sughrue Mion, PLLC

(57) ABSTRACT

A friction roller type reduction gear includes a first sun roller so mounted on an input shaft movably in the axial direction of the input shaft, a plurality of first cam grooves formed in the end face of the first sun roller, a cam plate so mounted on the input shaft as is opposed to the first cam groove side of the first sun roller, a plurality of second cam grooves so formed in the cam plate as are opposed to the first cam grooves, rolling elements interposed between the first and second cam grooves, and a cage for holding the rolling elements rollably, while a pitch circle diameter of the position for holding the rolling elements is different from pitch circle diameter of the first and second cam grooves.

3 Claims, 9 Drawing Sheets

(58) Field of Classification Search
USPC .......................................... 475/183, 196, 339
See application file for complete search history.

(56) References Cited

U.S. PATENT DOCUMENTS

| | | | |
|---|---|---|---|
| 3,682,020 A * | 8/1972 | Scheiter | F16H 13/06 475/114 |
| 2002/0083784 A1 | 7/2002 | Brauer et al. | |
| 2003/0211915 A1 | 11/2003 | Nogi et al. | |
| 2017/0191552 A1* | 7/2017 | Yoshioka | F16H 13/10 |

FOREIGN PATENT DOCUMENTS

| | | |
|---|---|---|
| JP | 2004-116670 A | 4/2004 |
| JP | 2009-520923 A | 5/2009 |
| JP | 2010-133501 A | 6/2010 |
| JP | 2012-207778 A | 10/2012 |
| WO | 2007/071227 A1 | 6/2007 |
| WO | 2010/131993 A1 | 11/2010 |

OTHER PUBLICATIONS

Written Opinion dated Dec. 22, 2014 issued by International Searching Authority in counterpart International Patent Application No. PCT/JP2014/075636 (PCT/ISA/237).
Search Report dated May 22, 2017 by the European Patent Office in counterpart European Patent Application No. 14858202.6.

* cited by examiner

FRICTION ROLLER TYPE REDUCTION GEAR

TECHNICAL FIELD

The invention relates to a friction roller type reduction gear.

BACKGROUND ART

Conventionally, there is known a reduction gear using a friction roller (for example, the patent document 1). Such reduction gear, for example, is interposed between the drive wheel and motor of an electric car to reduce the rotation speed of the motor and transmit the reduced rotation speed to the drive wheel. The reduction gear using a friction roller can restrict vibrations and noises in car operation.

RELATED ART REFERENCE

Patent Document

Patent Document 1: JP-A-S59-187154

SUMMARY OF THE INVENTION

Problems to be Solved by the Invention

A reduction gear using a friction roller includes, for example, a sun roller, a planetary roller and an annular roller, while the sun roller includes, for example, a loading mechanism using a ball cam. The loading mechanism using a ball cam includes three or more balls. When play occurs in one of the balls, the balls move on or slide along a cam groove, thereby raising a possibility that the transmission forces of the balls can be different from each other. This raises a possibility of reducing the transmission efficiency of the power.

The object of the invention is, in a friction roller type reduction gear including a loading mechanism using a ball cam, to prevent the balls of the loading mechanism from playing.

Means for Solving the Problems

The invention provides a friction roller type reduction gear including: an input shaft configured to receive at least power; a first sun roller, mounted on the input shaft, configured to move in an axial direction of the input shaft; a plurality of first cam grooves opened in such surface of the first sun roller as is perpendicular to the axial direction and arranged in a periphery of the input shaft, while a depth of the first cam grooves in the axial direction becomes largest in an extending-direction central portions; a second sun roller mounted on the input shaft such that the second sun roller is opposed to the surface of the first sun roller on an opposite side of the first cam grooves; a plurality of intermediate rollers contacted with outer peripheral portions of the first and second sun rollers; an annular roller having an inner peripheral surface that is configured to contact with the intermediate rollers; a cam plate mounted on the input shaft such that the cam plate is opposed to the surface of the first sun roller on the first cam groove side; a plurality of second cam grooves opened in such surface of the cam plate as is opposed to the first cam grooves and arranged in the periphery of the input shaft, while the depth in the axial direction is largest in the central portions; rolling elements interposed between the first and second cam grooves; and a cage configured to contact with the rolling elements and configured to hold the rolling elements rollably, with a pitch circle diameter of a position for holding the rolling elements different from pitch circle diameter of the first and second cam grooves.

In the friction roller type reduction gear, the pitch circle diameter of the position of the cage for holding the rolling elements (balls) is different from the pitch circle diameter of the first and second cam grooves. Thus, the rolling elements are moved in the diameter direction by the cam grooves to press the inner peripheral surfaces of the holes of the cage outward in the diameter direction. That is, the rolling elements receive simultaneously a force going outward in the diameter direction of the cage from inward in the diameter direction and a force generated by the elastic restoring force of the cage and going inward in the diameter direction of the cage from outward in the diameter direction. Thus, the rolling elements are always contacted with the cam surfaces of the first and second cam grooves and with the inner peripheral surfaces of the holes of the cage with a contact pressure, thereby preventing the rolling elements from playing. In this manner, according to the invention, in the friction roller type reduction gear including a loading mechanism using a ball cam, the balls of the loading mechanism can be prevented from playing.

Preferably, the cage may include holes adapted to hold their associated balls and each having a diameter larger than that of the ball, the pitch circle diameter of the cage may be smaller than the pitch circle diameter of the first cam grooves of the first sun roller and the second cam grooves of the cam plate, the pitch circle diameter of the first and second cam grooves may be equal to or larger than a value obtained when the diameter of the ball holding hole of the cage is added to the pitch circle diameter of the cage and the diameter of the ball is subtracted therefrom. Thus, the balls are moved in the diameter direction by the cam grooves to press the inner peripheral surfaces of the holes of the cage inward in the diameter direction. That is, each ball receives simultaneously a force generated by the rolling contact thereof with the cam grooves and going inward in the diameter direction of the cage from outward in the diameter direction and a force generated by the elastic restoring force of the cage and going outward in the diameter direction of the cage from inward in the diameter direction. Thus, the balls are always contacted with the cam surfaces of the first and second cam grooves and with the inner peripheral surfaces of the holes of the cage, thereby preventing the balls from playing.

Preferably, the cage may include holes adapted to hold their associated balls and each having a diameter larger than that of the ball, the pitch circle diameter of the cage may be larger than the pitch circle diameter of the first cam grooves of the first sun roller and the second cam grooves of the cam plate, and the pitch circle diameter of the cage may be equal to or larger than a value obtained when the diameter of the ball holding hole of the cage is added to the pitch circle diameter of the first and second cam grooves and the diameter of the ball is subtracted therefrom. Thus, even when the balls are caused to move outward in the diameter direction of the cage by centrifugal force, they are prevented against movement. Then, when torque is input into the loading device, a loading force proportional to the torque and according to a set value can be provided.

Advantage of the Invention

According to the invention, in the friction roller type reduction gear including a loading mechanism using a ball cam, the balls of the loading mechanism can be prevented from playing.

MODES FOR CARRYING OUT THE INVENTION

Description is given specifically of a mode (an embodiment) for carrying out the invention with reference to the drawings. The invention is not limited by the below-mentioned embodiment.

Figure 1A:
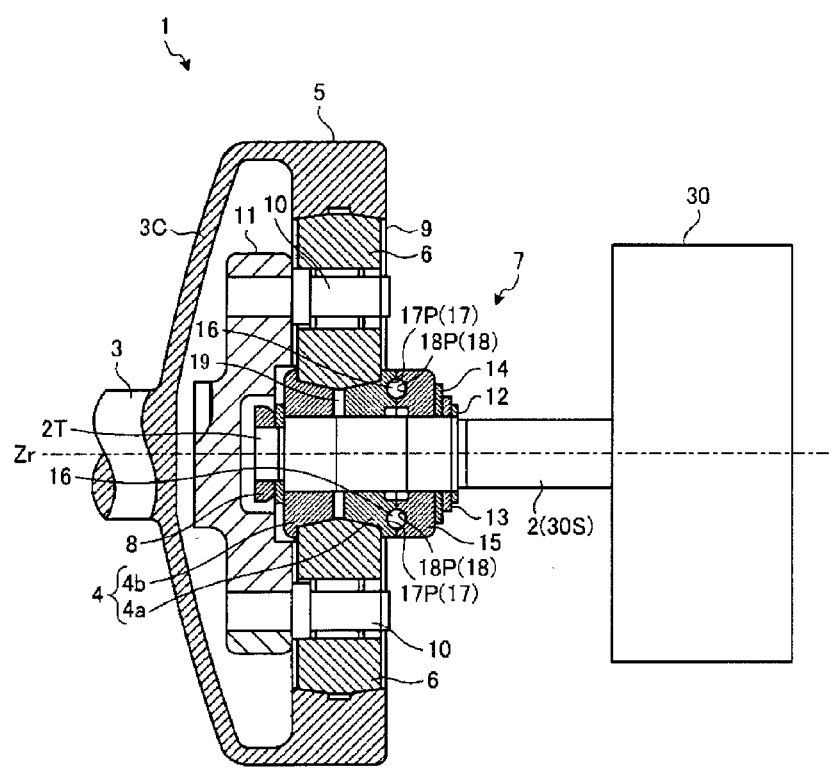
FIG. 1A is a structure view of an example of a friction roller type reduction gear according to the present embodiment.
Figure 1B:
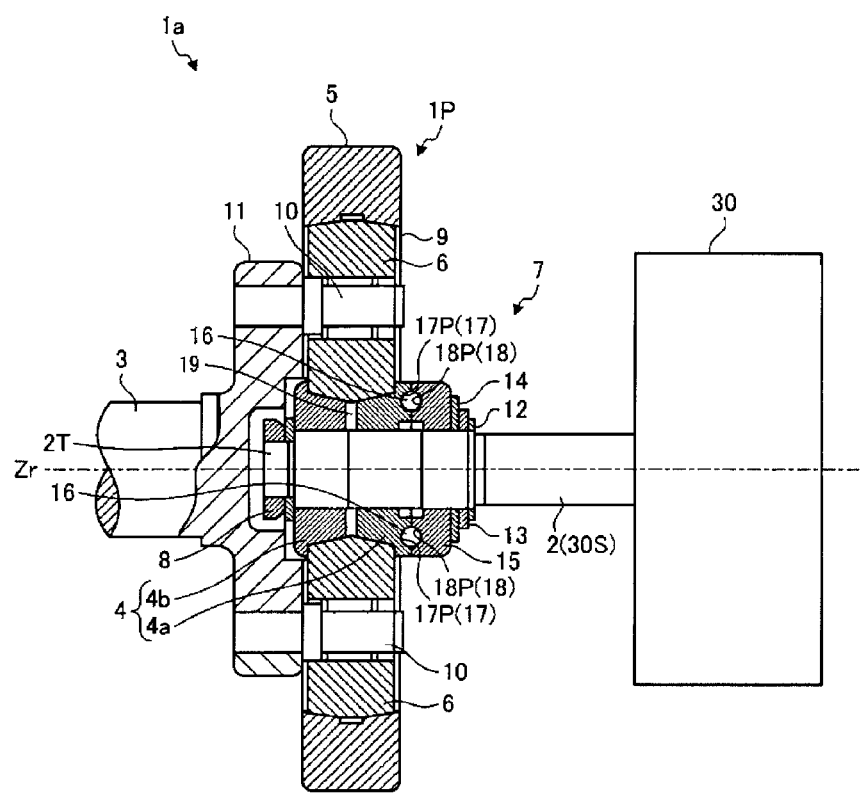
FIG. 1B is a structure view of another example of a friction roller type reduction gear according to the embodiment.
Figure 2:
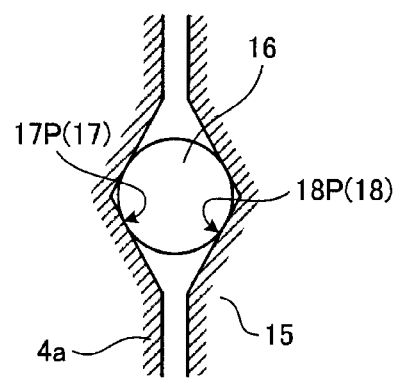
FIG. 2 is an explanatory view of the operation of a loading device included in the friction roller type reduction gear according to the embodiment.
Figure 3:
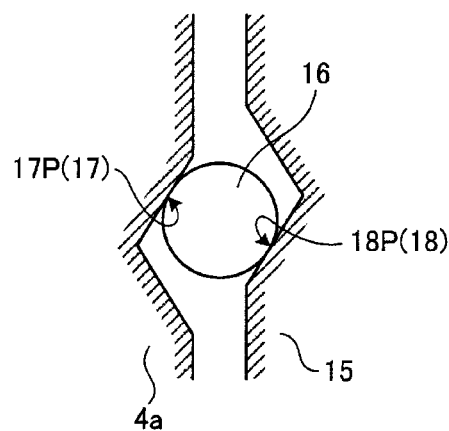
FIG. 3 is an explanatory view of the operation of the loading device included in the friction roller type reduction gear according to the embodiment.

FIG. 1A is a structure view of an example of a friction roller type reduction gear according to the embodiment. FIG. 1B is a structure view of another example of the friction roller type reduction gear according to the embodiment. FIGS. 2 and 3 are explanatory views of the operation of a loading device included in the friction roller type reduction gear according to the embodiment. A friction roller type reduction gear (which is hereinafter called a reduction gear properly) 1 is, for example, an apparatus which reduces power generated by a motor 30 and outputs such reduced power. In the reduction gear 1 of FIG. 1A, power input therein is transmitted by friction force between rollers and is then output.

The reduction gear 1 includes an input shaft 2, an output shaft 3, a sun roller 4, an annular roller 5, multiple planetary rollers 6, and a loading device 7. Using friction between the sun roller 4, planetary rollers 6 and annular roller 5, it transmits power between the input and output shafts 2 and 3. Thus, it is a friction roller type reduction gear using the planetary rollers.

The input shaft 2 is a member which rotates about an axis (which is hereinafter called a rotation axis) Zr. Into the input shaft 2, there is input at least power. In the embodiment, into the input shaft 2, there is input the power of the motor 30. Also, the input shaft 2 may also input an input from the output shaft 3 of the reduction gear 1 into the motor 30. In this case, the motor 30 functions as a generator and generates (regenerates) power. In the embodiment, the input shaft 2 is the output shaft 30S of the motor 30 serving as a power generator. That is, the output shaft 30S of the motor 30 serves also as the input shaft 2 of the reduction gear 1. However, this is not limitative. For example, the output shaft 30S of the motor 30 and the input shaft 2 of the reduction gear 1 may also be connected together by a connector.

The sun roller 4 is mounted on the input shaft 2. It includes a first sun roller 4a and a second sun roller 4b which are both mounted on the outer peripheral portion of the input shaft 2 and are disposed opposed to each other. More specifically, they are opposed to each other with a specific clearance between their respective one-end portions perpendicular to the rotation axis Zr. The first and second sun rollers 4a and 4b both rotate about the rotation axis Zr.

The first sun roller 4a is disposed on the motor 30 side of the input shaft 2. It can rotate relative to the input shaft 2 and also can move in the rotation axis Zr direction of the input shaft 2. The second sun roller 4b is disposed at a position more distant from the motor 30 than the first sun roller 4a. It is mounted on the input shaft 2 through, for example, a key and a key groove, or a spline and a spline groove, whereby it is prevented from moving, that is, rotating in the peripheral direction relative to the input shaft 2.

The first and second sun rollers 4a and 4b increase in diameter from their respective one-side end faces toward their respective other-side end faces. That is, the side surfaces of the first and second sun rollers 4a and 4b are inclined in a direction where their outside diameters increase from the one-side end faces toward the other-side end faces. These side surfaces are rolling contact surfaces which roll in contact with the multiple planetary rollers 6. When viewing the sun roller 4 as a whole, the outside diameters of the rolling contact surfaces are small in the middle portion in the rotation axis Zr direction and increase toward the two end portions.

The annular roller 5 is formed in an annular shape as a whole and is mounted on the output shaft 3 in the periphery of the sun roller 4 concentrically with the sun roller 4. The inner peripheral surface of the annular roller 5 provides a rolling contact surface inclined in a direction where the inside diameter thereof increases toward the central portion in the rotation axis Zr direction. Inside the annular roller 5, there are arranged the multiple planetary rollers 6, while the inner peripheral surface of the annular roller 5, that is, the rolling contact surface is contacted with the side surfaces of the planetary rollers 6.

The multiple planetary rollers 6 are arranged in multiple locations in the circumferential direction of an annular space 9 formed between the outer peripheral surface of the sun roller 4 and the inner peripheral surface of the annular roller 5. The planetary rollers 6 are respectively intermediate rollers. Each planetary roller 6 is mounted through a radial needle bearing on the periphery of a planetary shaft 10 serving as its own rotation shaft arranged parallel to the rotation axis Zr. This structure enables the multiple planetary rollers 6 to rotate around their respective planetary shafts 10.

The base ends of the respective planetary shafts 10 supporting the multiple planetary rollers 6 are mounted on a carrier 11. The carrier 11 is supported and fixed to the fixed part of a housing, etc. The outer peripheral surface of each planetary roller 6 is a convex curved surface in which the meridian section thereof, that is, the section obtained when cut along a plane including the rotation shaft of the planetary roller 6 and parallel to such rotation shaft, has an arc-like shape. Also, the outer peripheral surfaces of the planetary rollers 6 are contacted with the outer peripheral surface of the sun roller 4 and the inner peripheral surface of the annular roller 4.

The loading device 7 includes a loading mechanism using a ball cam and is interposed between the first sun roller 4a and input shaft 2. In the embodiment, it includes a cam plate 15, a first sun roller 4a and multiple balls 16 serving as rolling elements. On the intermediate portion of the input shaft 2, there is locked a support ring 13 by a retaining ring 12. Between the support ring 13 and first sun roller 4b, sequentially from the support ring 13, there are arranged a disc ring 14, cam plate 15 and multiple balls 16. A first cam surface 17P and a second cam surface 18P are arranged in the multiple locations in the respective circumferential directions of the base end face, namely, the other end face of the first sun roller 4a and the end face of the cam plate 15. The first cam surface 17P forms a first cam groove 17, and the second cam surface 18P formed a second cam groove 18. The first and second cam surfaces 17P and 18P respectively have such a shape that the depth in the rotation axis Zr direction is deepest in the central portion in the extending directions (for example, circumferential directions) of the first and second cam grooves 17 and 18 and gradually reduces toward their two ends. The balls 16 are interposed between the first and second cam grooves 17 and 18. More specifically, one ball 16 is interposed between a pair of opposed first and second cam surfaces 17P and 18P.

In the loading device 7 with the input shaft 2 stopped, as shown in FIG. 2, each ball 16 exists in the deepest portions of the first and second cam surfaces 17P and 18P. In this state, the disc ring 14, due to its own elasticity, presses the first sun roller 4a toward the second sun roller 4b arranged opposed to such surface of the first sun roller 4a as is opposite to the first cam groove 17. When the input shaft 2 rotates, each ball 16, as shown in FIG. 3, moves to the shallow portions of the first and second cam surfaces 17P and 18P. And, each ball 16 spreads the clearance between the first sun roller 4a and cam plate 15 and presses the first sun roller 4a toward the second sun roller 4b. Thus, due to a larger one of the elasticity of the disc spring 14 and the thrust generated when the ball moves onto the first and second cam surfaces 17P and 18P, the first sun roller 4a is rotated while being pressed toward the second sun roller 4b.

While the reduction gear 1 is in operation, due to the thrust in the rotation axis Zr direction generated by the loading device 7, a clearance 19 between the first and second sun rollers 4a and 4b is reduced, thereby increasing the surface pressure of the contact portion between the outer peripheral surface of the sun roller 4 including the first and second sun rollers 4a and 4b and the outer peripheral surfaces of the planetary rollers 6. With the increasing surface pressure, the planetary rollers 6 are pressed outward in the diameter direction of the first sun roller 4a and annular roller 5, thereby increasing also the surface pressures of the contact portions between the inner peripheral surface of the annular roller 5 and the outer peripheral surfaces of the planetary rollers 6. This increases the surface pressures of the surfaces of the multiple rolling contact portions serving as traction portions, which intervene between input and output shafts 2 and 3 and are to be used for power transmission, according to the size of torque to be transmitted between the input and output shafts 2 and 3.

When the input shaft 2 is rotated in this state, the rotation thereof is transmitted from the sun roller 4 to the planetary rollers 6, whereby the planetary rollers 6 revolve around the sun roller 4 while rotating on their own axes. Since the carrier 11 is fixed, the rotation of the planetary rollers 6 on their own axes causes the annular roller 5 to rotate. Thus, the rotation of the input shaft 2 is transmitted through the sun roller 4 and planetary rollers 6 to the annular roller 5. As the annular roller 5 rotates, the output shaft 3 mounted on the annular roller 5 rotates.

In the embodiment, while the carrier 11 is fixed, output is taken out from the annular roller 5. However, like a reduction gear 1a shown in FIG. 1B, the annular roller 5 may also be supported and fixed to the fixed part of a housing, etc. and the carrier 11 may also be mounted on the base end of the output shaft 3. In the reduction gear 1a, when the input shaft 2 is rotated, the rotation thereof is transmitted from the sun roller 4 to the planetary rollers 6, thereby revolving the planetary rollers 6 around the sun roller 4 while rotating on their own axes. The revolving movements of the planetary rollers 6 can be taken out from the output shaft 3 through the carrier 11.

The surface pressures of the traction portions become proper according to the size of torque to be transmitted between the input and output shafts 2 and 3. Thus, the reduction gear 1 can prevent occurrence of excessive slippage in the traction portions and can prevent the surface pressures of the traction portion from getting excessively large and thus the rolling resistance from getting excessively large.

Figure 4:
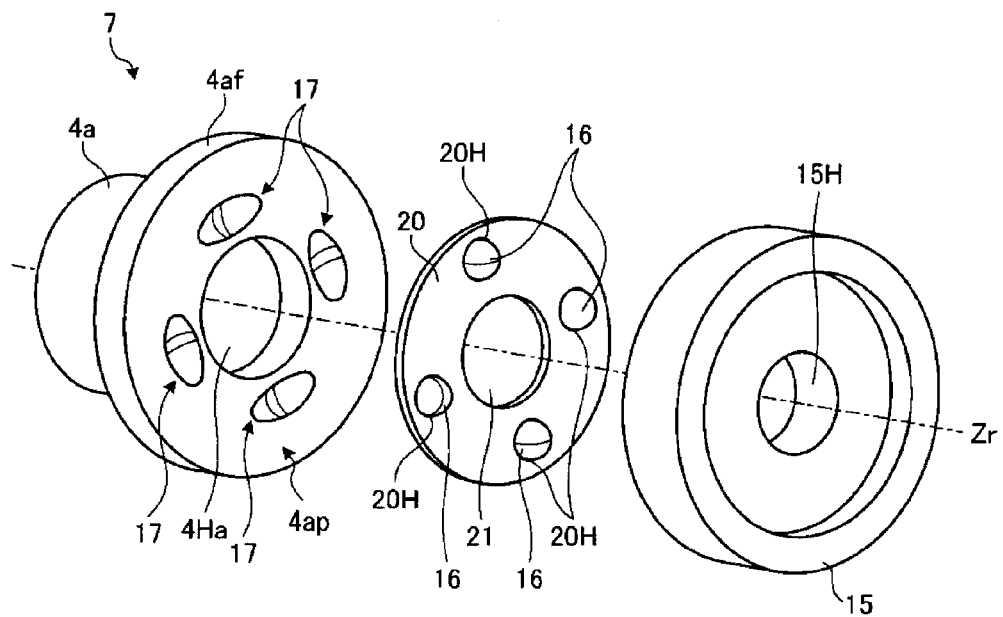
FIG. 4 is an exploded perspective view of the loading device.
Figure 5:
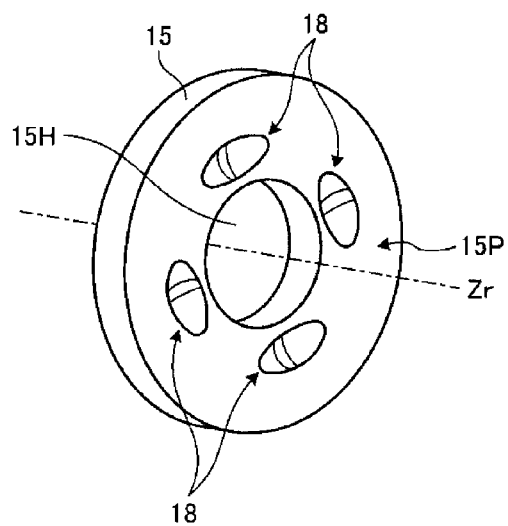
FIG. 5 is a perspective view of a cam plate.
Figure 6:
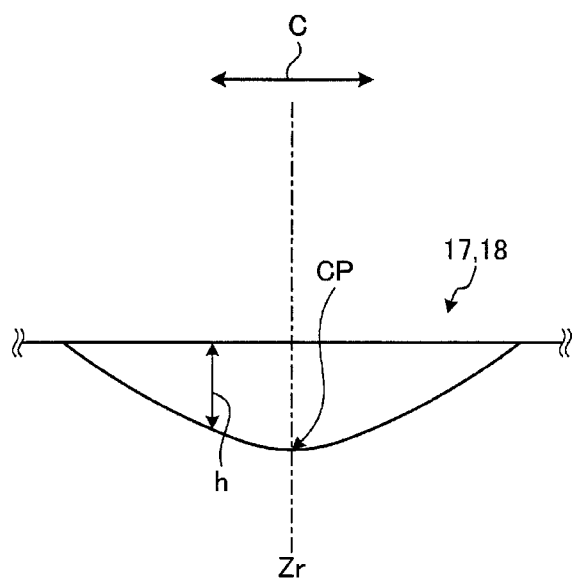
FIG. 6 is a typically explanatory view of the section of first and second cam grooves.

FIG. 4 is an exploded perspective view of the loading device. FIG. 5 is a perspective view of the cam plate. FIG. 6 is a typical explanatory view of the section of the first and second cam grooves. As shown in FIG. 4, the first sun roller 4a includes on the cam plate 15 side a flange part 4af projecting outward in the diameter direction. In the embodiment, between the first sun roller 4a and cam plate 15, there is interposed a cage 20 for holding the balls 16 rollably. It is an annular plate-shaped member having, in the circumferential direction, multiple (in the embodiment, four) holes 20H each for holding its associated ball 16. The cage 20 includes in its central portion a penetration hole 21 enabling penetration of the input shaft of FIG. 1A therethrough. It is made of elastically deformable material.

Multiple first cam grooves 17 included in the first sun roller 4a are formed in the flange part 4af of the first sun roller 4a. The multiple first cam grooves 17 open in the surface of the first sun roller 4a perpendicular to the rotation axis Zr, specifically, the end face 4ap thereof on the cam plate 15 side. The first sun roller 4a including the flange part 4af includes in the central portion thereof a penetration hole 4Ha through which the input shaft 2 of FIG. 1A penetrates. The multiple first cam grooves 17 are formed in the periphery of the penetration hole 4Ha, that is, in the periphery of the input shaft 2. They extend toward the tangential direction of the first sun roller 4a and, as shown in FIG. 6, the depth h thereof in the rotation axis Zr direction becomes largest in the central portion CP in the extending direction (direction shown by the arrow C) thereof.

The cam plate 15, as shown in FIGS. 4 and 5, is an annular plate-shaped member having, in the central portion of the annular plate, a penetration hole 15H enabling penetration of the input shaft 2 of FIG. 1A therethrough. Multiple second cam grooves 18 included in the cam plate 15 open in such surface of the cam plate 15 as is perpendicular to the rotation axis Zr direction and exists on the first sun roller 4a side, that is, in the end face 15P opposed to the first grooves 17 across the cage 20. The grooves 18 are formed in the periphery of the penetration hole 15H, that is, in the periphery of the input shaft 2, and extend toward the tangential direction of the cam plate 15; and, as shown in FIG. 6, the depth h thereof in the rotation axis Zr direction becomes largest in the central portion CP in the extending direction (direction shown by the arrow C) thereof.

Figure 7:
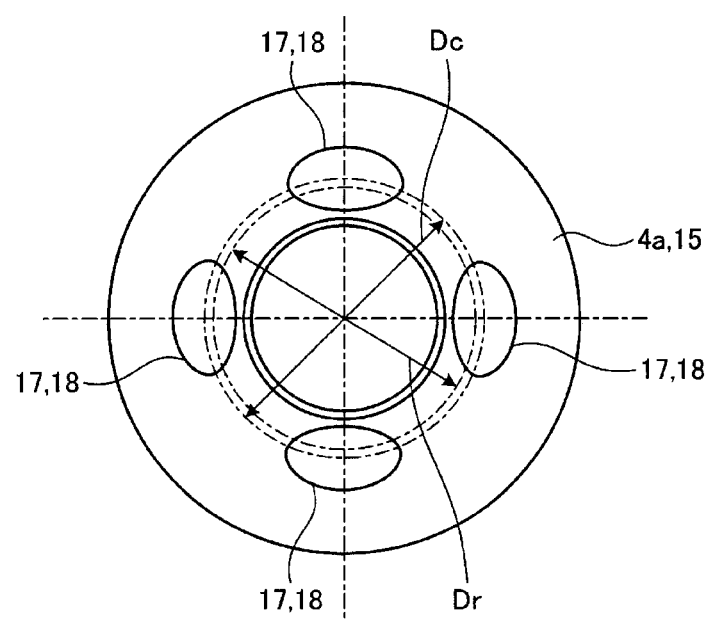
FIG. 7 is an explanatory view of the relationship between the pitch circle diameter of a cage and the pitch circle diameters of the first and second cam grooves.
Figure 8:
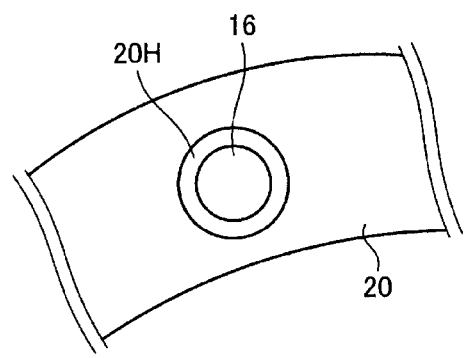
FIG. 8 is an explanatory view of the relationship between the cage and ball.
Figure 9:
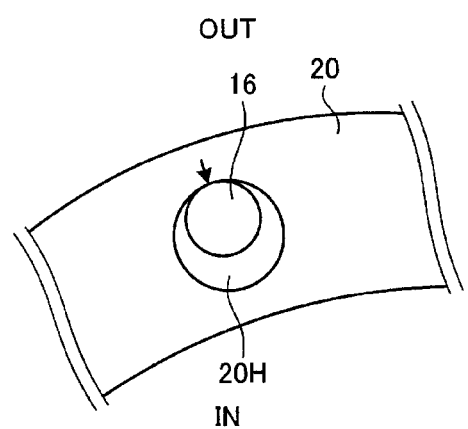
FIG. 9 is an explanatory view of the relationship between the cage and ball.

FIG. 7 is an explanatory view of the relationship between the pitch circle diameter of the cage and the pitch circle diameter of the first and second cam grooves. FIGS. 8 and 9 are explanatory views of the relationship between the cage and balls. The pitch circle diameter (which is hereinafter called "hold position pitch circle diameter" properly) Dr of the position where the cage 20 holds the balls 16, that is, the position (which is hereinafter called "hold position" properly) of the hole 20H is different in size from the pitch circle diameter (which is hereinafter called "cam groove pitch circle diameter" properly) Dc of the first and second cam grooves 17 and 18. In the example shown in FIG. 7, the hold position pitch circle diameter Dr is smaller than the cam groove pitch circle diameter. The diameter Dr is the diameter of a circle which connects together the centers of the multiple holes 20H of the cage 20 and exists around the rotation axis Zr. The diameter Dc is the diameter of a circle which connects together the diameter-direction central portions of the first sun roller 4a and cam plate 15 in the central portion CP in the extending direction of the first and second cam grooves 17 and 18 and exists around the rotation axis Zr.

In the embodiment, the loading device 7 includes four balls 16 arranged at equal intervals and, as shown in FIG. 8, held in the holes 20H of the cage 20. Where the clearance between the adjoining balls 16 is expressed as a center angle having the rotation axis Zr as a center, the center angles of the four balls 16 are arranged at 90-degree intervals. The clearance between the four balls 16 is kept constant by the cage 20. When the loading device 7 includes four or more balls 16, there is a possibility that a playing ball 16 can exist, specifically, due to the free movement of the balls within the clearance between the cage 20 and balls, there can exist a ball which does not contribute to transmission of power between the cam plate 15 and first sun roller 4a.

There exists a slight clearance between the cage 20 and balls 16. In the case that the four first and second cam grooves 17 and 18 and the four balls 16 are respectively the same in shape, when torque is input, forces to be transmitted to the balls 16 are all equal. However, with the four first and second cam grooves 17 and 18 different in shape, the forces to be transmitted to the balls 16 are caused to vary from each other.

In the case of three balls 16, although the forces are different in size, the forces are transmitted to all balls 16. However, in the case of four balls 16, they provide a redundant system which, in extreme cases, raises a possibility that no force can be transmitted to one of the four balls 16 at all, thereby allowing such ball 16 to play within the cage 20. When the playing ball 16 is always the same ball, there is no problem. However, there is a possibility that the other ball 16 can play.

For example, it is assumed that, where the four balls 15 are called balls A, B, C and D, in a state, the ball A plays and the ball B transmits a force; and, in the next stage, the ball A transmits a force and the ball B plays. It is impossible to specify the position of contact between the first and second cam grooves 17, 18 and the ball A at the moment the ball A transmits the force. The reason for this is that, before the ball A is contacted with the first and second cam grooves 17 and 18, it plays within the cage 20, whereby it can move within the range of the clearance between the cage 20 and itself. This raises a possibility that the ball A can transmit the force at a position where it moves on to the first and second cam grooves 17 and 18.

When the playing ball 16 changes one after another, there is a possibility that the balls 16 can move onto the first and second cam grooves 17 and 18 one after another and finally the ball 16 can drop out from the first and second cam grooves 17 and 18. In this manner, when the ball 16 plays, there is a possibility that the ball can move onto at least one of the first and second cam grooves 17 and 18. Thus, it is necessary to prevent the ball 16 from playing.

In the embodiment, in order to prevent the balls 16 against play, the hold position pitch circle diameter Dr and cam groove pitch circle diameter Dc are different in size from each other. Specifically, the diameter Dr is smaller in size than the diameter Dc. Each ball 16, as shown in FIG. 8, is held in the cage 20 of an elastically deformable material or shape, and exists at the position of the hold position pitch circle diameter.

In this state, when the ball 16 is held between the first cam groove 17 of the first sun roller 4a and the second cam groove 18 of the cam plate 15, since the hold position pitch circle diameter Dr and cam groove pitch circle diameter Dc are different in size (in this example, Dr<Dc), the ball 16 moves in the diameter direction. That is, when the ball 16 is held between the first cam surface 17P of the first cam groove 17 and the second cam surface 18P of the second cam groove 18, the ball 16 moves in the diameter direction along the diametrically mutually facing side surface of the cam grooves 17 and 18 (cam groove side surfaces formed perpendicularly to the section of the cam groove shown in FIGS. 2 and 3). As shown in FIG. 9, the ball is contacted with the diametrically outside inner peripheral surface of the hole 20H of the cage 20 to press the inner peripheral surface of the hole 20H outward in the diameter direction.

The then ball 16, due to its rolling contact with the cam surfaces 17P and 18P, receives a force going toward the diametrical outside (OUT) of the cage 20 from the diametrical inside (IN) thereof, and also, due to the elastic restoring force, receives a force going toward the diametrical inside (IN) of the cage 20 from the diametrical outside (OUT) thereof. The ball 16, with the above forces acting thereon simultaneously, is held between the first and second cam grooves 17 and 18.

Consequently, the ball 16 is always contacted with the first and second cam surfaces 17P and 18P and with the inner peripheral surface of the hole 20H of the cage H with a contact pressure, thereby preventing the ball 16 against play. This can reduce a possibility that the ball can move onto at least one of the first and second cam grooves 17 and 18. This also enables all balls 16 to transmit forces between the cam plate 15 and first sun roller 4a.

Figure 10:
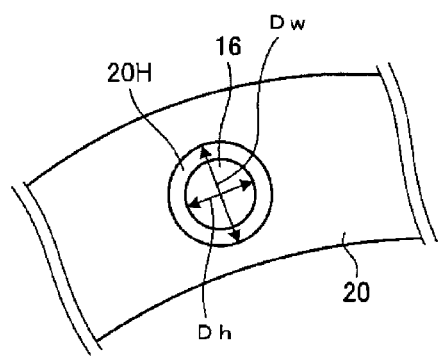
FIG. 10 is an explanatory view of the relationship between the diameter of the ball and the diameter of the hole of the cage.
Figure 11:
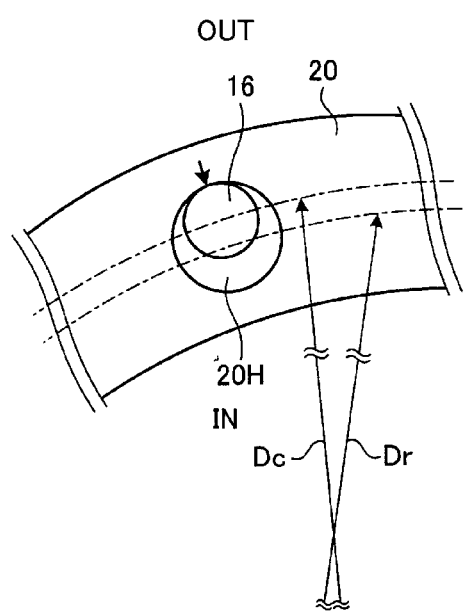
FIG. 11 is an explanatory view of the relationship between the cage and ball.

FIG. 10 is an explanatory view of the relationship between the diameter of the balls and the diameter of the holes of the cage. FIG. 11 is an explanatory view of the relationship between the cage and balls. The diameter of the hole 20H of the cage 20 is Dw. The diameter Dw of the hole 20H is larger than the diameter Dh of the ball 16 held in the hole 20H. The cam groove pitch circle diameter Dc may preferably be equal to and more than a value obtained when the diameter Dw of the hole 20H is added to the hold position pitch circle diameter Dr and the diameter Dh of the ball 16 is subtracted therefrom. This relationship is expressed by an equation (1): that is, $$Dc \geq Dr + Dw - Dh \quad (1)$$

Equation (1), as shown in FIG. 11, means that the pitch circle diameter of the diameter-direction position of the ball 16 when it is pressed against the diameter-direction outside of the cage 20 and is contacted with the hole 20H of the cage 20 is equal to or smaller than the cam groove pitch circle diameter Dc. Ideally, the hold position pitch circle diameter Dr and cam groove pitch circle diameter Dc may coincide with each other. However, for their coincidence, the dimensional tolerances of the respective parts must be controlled, thereby raising a possibility of increasing the cost.

Thus, as shown in FIG. 11, the pitch circle diameter of the ball 16 when it is externally contacted with the diameter-direction outside of the hole 20H of the cage 20 is set equal to or smaller than the cam groove pitch circle diameter Dc, preferably, may be set smaller than the cam groove pitch circle diameter Dc. In this state, when the ball 16 is held between the cam plate 15 and first sun roller 4a shown in FIG. 4, it is moved toward the diameter-direction outside of the cage 20 due to the elastic deformation of the cage 20, thereby enabling coincidence between the pitch circle diameter of the ball 16 and the cam groove pitch circle diameter Dc. Such coincidence by the cage 20 prevents the ball 16 from moving toward the diameter-direction outside of the cage even when it is going to move, whereby, when torque is input into the loading device 7, a loading force proportional to the torque and according to the set value can be obtained.

The hold position pitch circle diameter Dr may also be a value obtained when the diameter Dw of the hole 20H is added to the cam groove pitch circle diameter Dc and the diameter Dh of the ball 16 is then subtracted therefrom. This relationship is expressed by an equation (2): that is, $$Dr \geq Dc + Dw - Dh \quad (2)$$

Figure 12:
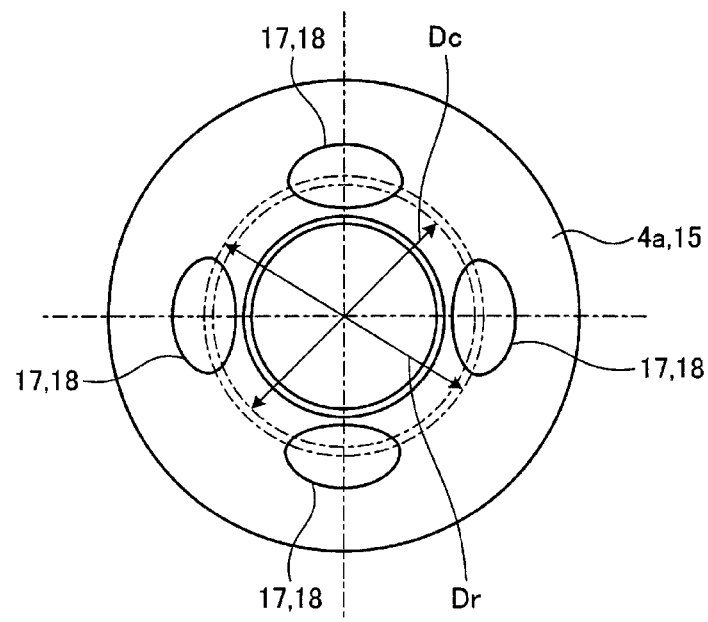
FIG. 12 is an explanatory view of a modification of the relationship between the pitch circle diameter of the cage and the pitch circle diameter of the first and second cam grooves.
Figure 13:
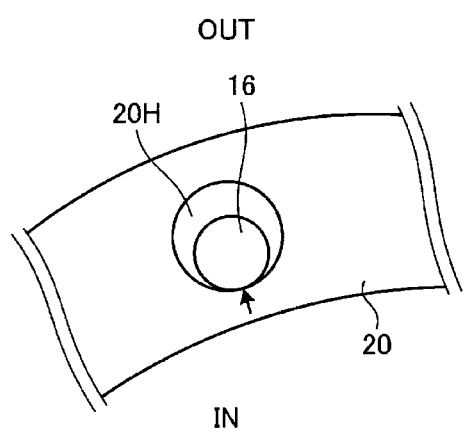
FIG. 13 is an explanatory view of a modification of the relationship between the cage and ball.

FIG. 12 is an explanatory view of a modification of the relationship between the pitch circle diameter of the cage and the pitch circle diameter of the first and second cam grooves. FIG. 13 is an explanatory view of a modification of the relationship between the cage and ball. In this modification, as shown in FIG. 12, the hold position pitch circle diameter Dr is larger in size than the cam groove pitch circle diameter Dc (Dr>Dc). In this case, as shown in FIG. 13, the ball 16 is contacted with the inner peripheral surface of the diameter-direction inside of the hole 20H of the cage 20 to press the inner peripheral surface of the hole 20H outward in the diameter direction. The then ball 16, due to its rolling contact with the cam surfaces 17P and 18P, receives a force going toward the diameter-direction inside (IN) of the cage 20 from the diameter-direction outside (OUT) thereof, and receives a force going toward the diameter-direction outside (OUT) of the cage 20 from the diameter-direction inside (IN) thereof due to the elastic restoring force of the cage 20. The ball 16, with the above forces acting simultaneously thereon, is held between the first and second cam grooves 17 and 18. Consequently, the ball 16 is always contacted with the first and second cam surfaces 17P, 18P and the inner peripheral surface of the hole 20H of the cage 20 with a contact pressure and is thereby prevented against play. This eliminates a possibility that the ball 16 can move onto at least one of the first and second cam grooves 17 and 18. Also, all balls 16 are enabled to transmit forces between the cam plate 15 and first sun roller 4a.

The cage 20 has a flexural modulus of 0.5 GPa to 5 GPa. The above range of the flexural modulus of the cage 20 enables the cage 20 to positively contact the ball 16 with the first cam surface 17P of the first groove 17 and the second cam surface 18P of the second cam groove 18, and also enables reduction of resistance when the ball 16 rolls within the cage 20. The cage 20 is made of material having the above-mentioned range of flexural modulus. The material includes resin, for example, PA66 (Polyamid 66 having flexural modulus of 3 GPa), PA6 (Polyamid 6 having flexural modulus of 2.5 GPa) or PPS (Poly Phenylene Sulfide having flexural modulus of 4.2 GPa). Here, the resin applicable to the cage 20 is not limited to them.

In the embodiment, the number of balls 16 equipped in the loading device 7 is not limited but, for example, it may be four or three. For example, for three balls 16, they are arranged at equal intervals with their center angles around the rotation axis Zr being 120°. Even in the three balls 16, when the hold position pitch circle diameter Dr and cam groove pitch circle diameter Dc are made different in size from each other, the contact positions of the balls with the first cam surface 17P of the first cam groove 17 and the second cam surface 18P of the second cam groove 18 can be stabilized, whereby, preferably, the transmission forces of the respective balls 16 can be uniformed.

Figure 14:
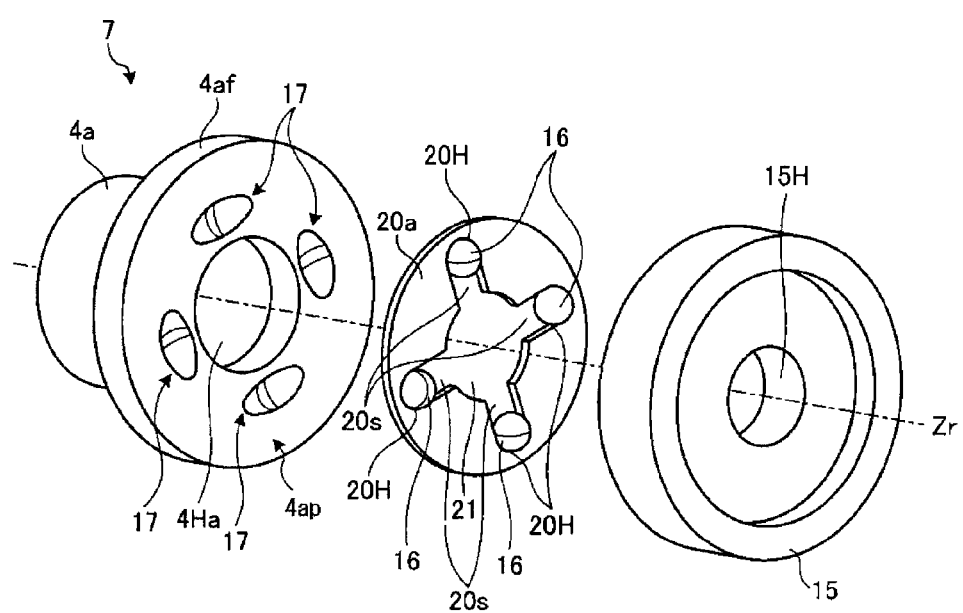
FIG. 14 is an exploded perspective view of a modification of the cage.

FIG. 14 is an exploded perspective view of a modification of the cage. The cage 20a includes grooves 20s for connecting together a penetration hole 21 and holes 20H. Even this cage can also provide similar operations and effects to the above cage 20.

As the drive apparatus of the electric car (electric car drive apparatus) including the motor 30 shown in FIG. 1 as the running motor thereof, there is used the reduction gear 1. In this case, in the reduction gear 1, the output of the motor 30 is input into the input shaft 2. And, the drive wheel of the electric car is mounted on the output shaft 30S of the reduction gear 1. The reduction gear 1 reduces the rotation speed of the motor 30 to increase torque and transmit the increased torque to the electric car drive wheel, thereby running the electric car.

Description has been given heretofore of the embodiment and modification. However, the embodiment and modification are not limited by the above-described contents. Also, the above-described composing elements include elements that can be assumed easily by persons skilled in the art, are substantially the same elements, and fall within the range equivalent to that of the above elements. Further, the above composing elements can also be combined with each other properly. Moreover, the composing elements can also be omitted, replaced or changed variously without departing from the subject matter of the embodiment and modification.

[Supplementary Information]

(1) The cage, preferably, may have a flexural modulus of 0.5 GPa to 5 GPa. This flexural modulus enables the cage to positively contact the rolling elements with the cam surfaces of the first and second cam grooves.

(2) The cage may preferably be made of resin, thereby enabling easy provision of a proper flexural modulus and reduction of weight.

(3) The input shaft may preferably be the output shaft of the motor. In this case, the input shaft of the friction roller type reduction gear can be used also as the output shaft of the motor, thereby enabling reduction in the number of parts.

(4) The invention provides an electric car drive apparatus which includes a motor and the above friction roller type reduction gear and transmits the output of the motor to the drive wheel through the friction roller type reduction gear. This electric car drive apparatus can prevent play of rolling elements (balls) included in the loading device of the friction roller type reduction gear. Thus, all rolling elements transmit their forces evenly, thereby preventing lowered power transmission efficiency. Also, since the rolling elements are prevented from moving onto the first and second cam grooves, the reliability of the friction roller type reduction gear can be enhanced.

This application is based on the JPA (Patent Application No. 2013-223622) filed on Dec. 28, 2013 and the JPA (Patent Application No. 2014-79681) filed on Apr. 8, 2014. Thus, the contents thereof are incorporated herein for reference.

DESCRIPTION OF REFERENCE NUMERALS AND SIGNS

1: Reduction gear
2: Input shaft
3: Output shaft
4: Sun roller
4a: First sun roller
4ap: End face
4Ha: Penetration hole
4b: Second sun roller
5: Annular roller
6: Planetary roller
7: Loading device
10: Planetary shaft
11: Carrier
15: Cam plate
15H: Penetration hole
15P: End face
16: Ball
17: First cam groove
17P: First cam surface
18: Second cam groove
18P: Second cam surface
20: Cage
20H: Hole
21: Penetration hole
30: Motor
30S: Output shaft
Zr: Rotation axis

The invention claimed is:

1. A friction roller type reduction gear comprising:
an input shaft configured to receive at least power;
a first sun roller, mounted on the input shaft, configured to move in an axial direction of the input shaft;
a plurality of first cam grooves opened in such surface of the first sun roller as is perpendicular to the axial direction and arranged in a periphery of the input shaft, while a depth of the first cam grooves in the axial direction becomes largest in an extending-direction central portions;
a second sun roller mounted on the input shaft such that the second sun roller is opposed to the surface of the first sun roller on an opposite side of the first cam grooves;
a plurality of intermediate rollers contacted with outer peripheral portions of the first and second sun rollers;
an annular roller having an inner peripheral surface that is configured to contact with the intermediate rollers;
a cam plate mounted on the input shaft such that the cam plate is opposed to the surface of the first sun roller on the first cam groove side;
a plurality of second cam grooves opened in such surface of the cam plate as is opposed to the first cam grooves and arranged in the periphery of the input shaft, while the depth in the axial direction is largest in the central portions;
rolling elements interposed between the first and second cam grooves; and
a cage configured to contact with the rolling elements and configured to hold the rolling elements rollably, with a pitch circle diameter of a position for holding the rolling elements different from pitch circle diameter of the first and second cam grooves.

2. A friction roller type reduction gear according to claim 1, wherein:
the cage has a hole for holding a ball and having a diameter larger than a diameter of the ball;
the pitch circle diameter of the cage is smaller than the pitch circle diameter of the first and second cam grooves of the first sun roller; and
the pitch circle diameter of the first and second cam grooves is equal to or larger than a value obtained when the diameter of the hole of the cage is added to the pitch circle diameter of the cage and the diameter of the ball is subtracted therefrom.

3. A friction roller type reduction gear according to claim 1, wherein:
the cage has a hole for holding a ball and having a diameter larger than a diameter of the ball;
the pitch circle diameter of the cage is larger than the pitch circle diameter of the first cam groove of the first sun roller and the second cam groove of the cam plate; and
the pitch circle diameter of the cage is equal to or larger than a value obtained when the diameter of the hole of the cage is added to the pitch circle diameter of the first and second cam grooves and the diameter of the ball is subtracted therefrom.

* * * * *